United States Patent [19]

Anderson

[11] 4,382,793

[45] May 10, 1983

[54] DEVICE FOR FEELING AUDIO AMPLIFIER OUTPUT

[76] Inventor: Douglas F. Anderson, 958 Frances La., Ft. Pierce, Fla. 33450

[21] Appl. No.: 329,264

[22] Filed: Dec. 9, 1981

[51] Int. Cl.³ .............................................. G09B 21/00
[52] U.S. Cl. ..................................... 434/112; 434/250; 340/407
[58] Field of Search ....................... 434/112, 114, 250; 340/407

[56] References Cited

U.S. PATENT DOCUMENTS

| | | | |
|---|---|---|---|
| 720,068 | 2/1903 | Reese ................................... | 434/112 |
| 1,738,289 | 12/1929 | Fletcher ......................... | 434/114 X |
| 4,310,315 | 1/1982 | Frank et al. .......................... | 434/114 |

FOREIGN PATENT DOCUMENTS 1341828 12/1973 United Kingdom ................. 434/114

Primary Examiner—William H. Grieb
Attorney, Agent, or Firm—Erwin M. Barnett

[57] ABSTRACT

An electrically chargeable plate of predetermined surface area is retained in contact with the skin of each of two participants. An electrical conductor connects each plate to one of the two terminals of the audio output of one of the channels of a stereo amplifier while the other channel plays through its speaker. Physical contact between the participants completes the circuit enabling both participants to feel the modulated impulses of the sound as well as hear the output of the speaker on the other channel. Both plates may be worn by one person to experience a comparable feeling or one plate and an electrically chargeable wand used in place of or in addition to the other plate enables either one or two persons to participate.

11 Claims, 7 Drawing Figures

U.S. Patent   May 10, 1983   Sheet 1 of 2   4,382,793
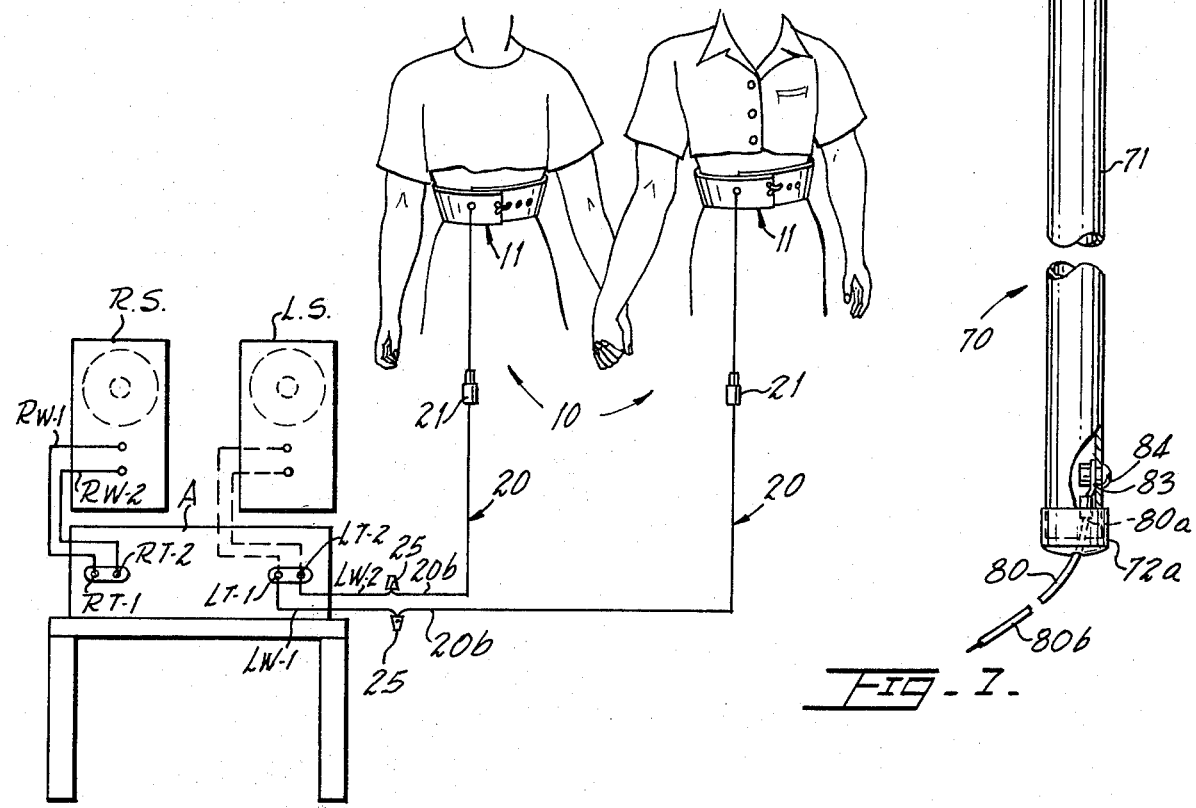
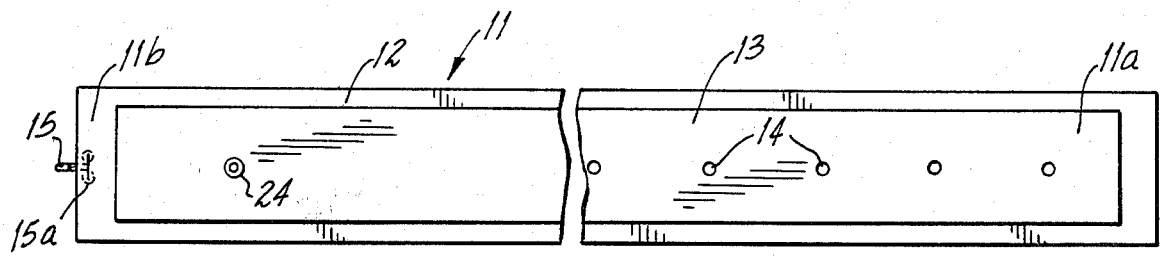
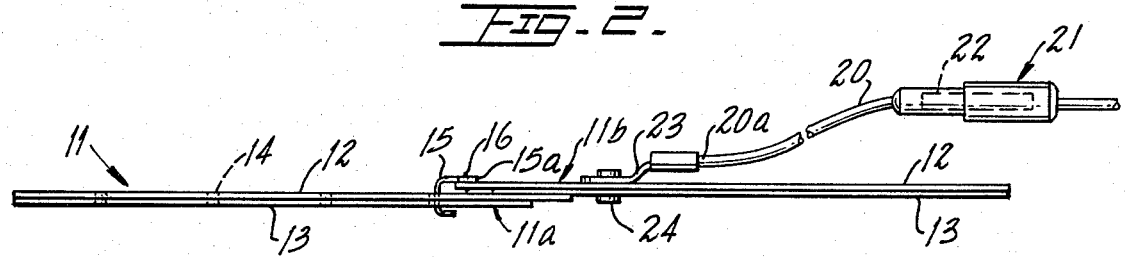

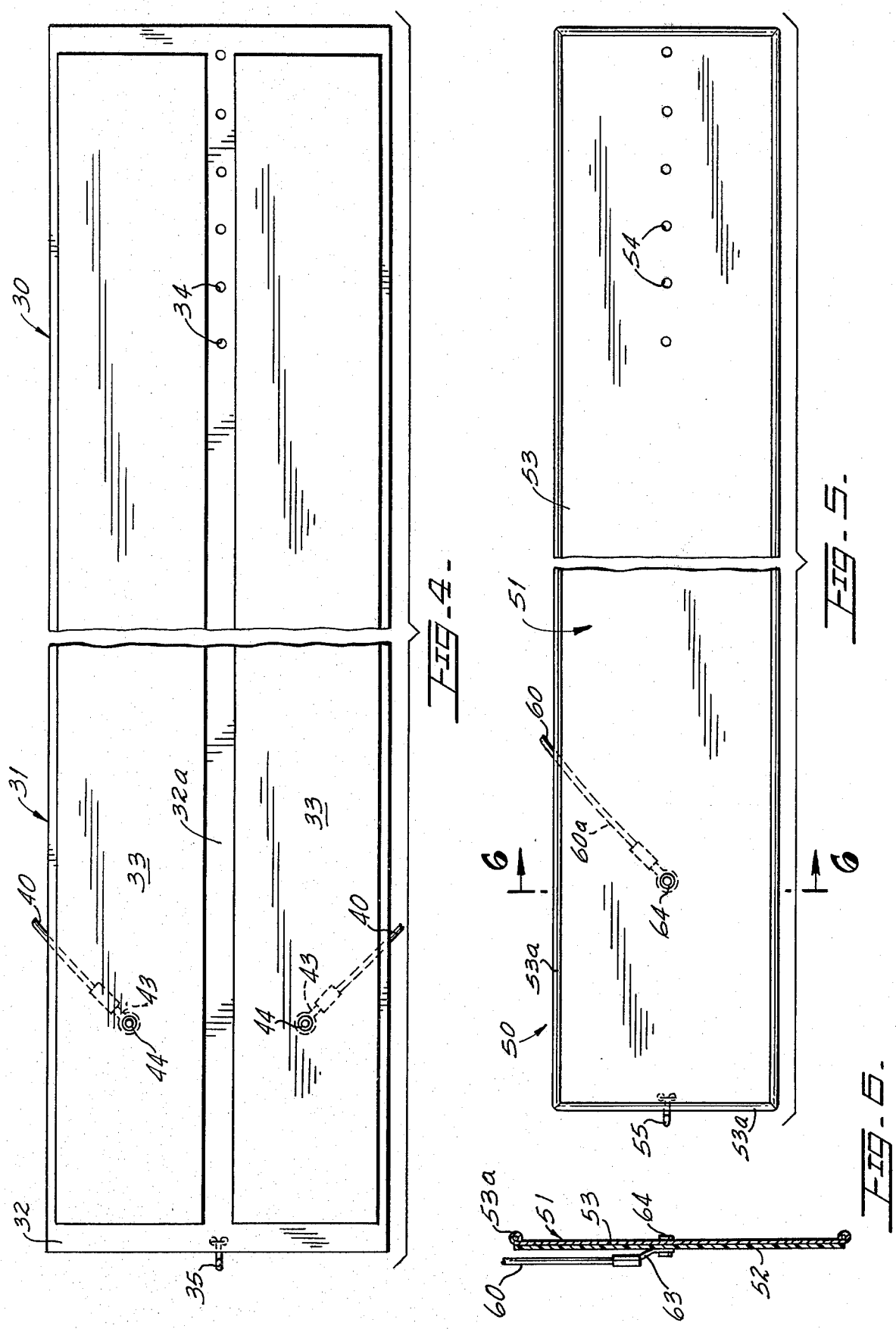

DEVICE FOR FEELING AUDIO AMPLIFIER OUTPUT

BACKGROUND OF THE INVENTION

1. Field of the Invention

This invention relates to body sensation providing devices and more particularly relates to skin contacting units adapted to be powered by one channel of audio output of a stereo amplifier enabling a couple, each wearing one of the units, to feel as well as hear the sound output of the amplifier when the couple is in skin contact with each other.

2. Description of the Prior Art

The sense of sight has often been used to complement the sense of hearing and thereby enhance the enjoyment of music. Thus, electrical impulses related to sound generation for speakers has been used to modulate various colored lights to respond to rhythms, amplitudes and melodies providing so called psychedelic lighting effects for simultaneous visual stimulation while listening and dancing to the music. This invention enables the listeners to feel as well as hear the music and may have uses in dance instruction for the profoundly hearing impaired.

SUMMARY OF THE INVENTION

Among the objects of the invention is to provide a device enabling a wearer to feel music and enjoy such feeling with another wearer by skin contact between both wearers, which device shall include two separate units, each adapted to encircle the torso of one of the two wearers and be connected by a lead wire to one of the output terminals of one of the channels of a stereo amplifier while the wearers hear the sound emitted by the other channel. A hand held wand replacing one of the torso encircling units shall permit an individual wearer to experience the feeling. The pair of units and wand shall comprise few and simple parts which are economical to manufacture and assemble at low cost in quantity production, which shall be durable, dependable and safe to operate.

The pair of units embodying the invention each comprises an elongated band formed as a torso encircling belt having adjustable buckle means for providing a snug fit around the wearer's torso. Each belt features a sheet of an electrical conductor material, such as, an aluminum foil or a thin flexible aluminum sheet, provided on one exposed surface thereof adapted to contact the wearer's skin. One end of a conductor lead wire is riveted to each belt making electrical contact with the sheet, the opposite end of the wire being adapted for connecting to one of the output terminals of a channel of a stereo amplifier which has been disconnected from its speaker. When the units are worn by two individuals, the sensation is primarily felt in the area of skin contact between the wearers.

A hand held wand of metal tubing connected to one end of a conductor lead wire may also be provided whereby the opposite end of the wand lead wire replaces or parallels one of the belt wires in the latter's connection to the output terminal of the amplifier. This enables a wearer of one of the belts to grasp the wand and feel the sensation while executing a dance routine where skin contact with a partner is lacking. Both belts may also be worn by one individual, or in a modified form, a pair of spaced conductor sheets, insulated from each other, may be mounted on a single belt. Where both conductor sheets are worn by one individual, the sensation is felt in the area of skin contact with the sheets.

BRIEF DESCRIPTION OF THE DRAWINGS

FIG. 1 is a schematic illustration of the device embodying the invention showing the belts mounted around the waists of two listeners and connected by lead wires to the output of a stereo amplifier.

FIG. 2 is an enlarged fragmentary view of one of the belts shown in FIG. 1 removed from the wearer and spread flat with the body contacting side thereof exposed.

FIG. 3 is an enlarged fragmentary top edge view of the belt shown in FIG. 2 but depicted as worn in FIG. 1 with the opposite ends secured together in overlapping relation.

FIG. 4 is a fragmentary view similar to FIG. 2 but of a belt modified to mount a pair of conductor sheets for providing the sensation to an individual wearer.

FIG. 5 is a fragmentary view similar to FIG. 2 showing a modified belt construction embodying the invention.

FIG. 6 is an enlarged sectional view taken on line 6—6 in FIG. 5 showing details of construction, and FIG. 7 is an elevational view of a wand embodying the invention, with parts broken away to show interior structure.

DESCRIPTION OF THE PREFERRED EMBODIMENTS

Referring in detail to the drawings, 10 generally denotes a device for feeling music, embodying the invention, seen in FIG. 1 to comprise a pair of body encircling belts 11 and a pair of lead wires 20, each wire 20 being connected at one end thereof to one of the belts 11 and having a separable holder 21 interposed along the length thereof housing a replaceable fuse 22. Belts 11 are identical in construction, one being shown in FIGS. 2 and 3 as formed with a supporting sheet or layer 12 of a flexible but shape retaining material having electrical non-conducting or insulating properties, such as, a vinyl or other suitable plastic resin, and a lining or layer 13 of an electrical conductor, such as aluminum foil, adhesively or otherwise bonded to layer 12. Belt 11 is provided with a suitable buckle means for adjustably connecting opposite ends 11a and 11b thereof in a snug, waist encircling position to accommodate wearers having waists in a range of different sizes. Such buckle means is seen as located along the midline of belt 11 and to comprise a series of spaced openings or holes 14 extending through both layers 12 and 13 adjacent end 11a and a hook 15 which may be made of wire bent to provide a pair of spaced loops 15a at an attachment end thereof through which a staple 16 extends and fastens hook 15 to layer 12 in position to project beyond the edge of belt end 11b.

For positive and durable attachment of lead wire 20 to belt 11 as well as an electrical connection between wire 20 and conductor layer 13, the end 20a of lead wire 20 mounts a wire connector 23 which may be of the eyelet type attached to lead wire 20 either by crimping or soldering in the conventional manner. Wire connector 23 is permanently attached to the outfacing side of plastic layer 12 of belt 11 by suitable means, shown in FIG. 3 as a grommet-type metal rivet 24 which extends through the eyelet of connector 23 and through both layers 12 and 13 making electrical contact with the latter. The opposite end 20b of lead wire 20 is suitably fashioned for connecting to an audio output terminal of one of the channels of a stereo amplifier and may be provided with a connector of the prong-type (not shown) or simply may terminate in a short length of bare wire from which the insulation has been stripped to be connected as hereinafter described.

The practical utility and operation of device 10 will now be apparent. Lead wires 20 extending from belts 11 are supplied in desired lengths, such as, 9, 12 or more feet, in order to provide for adequate distance between the wearers and the amplifier A as well as for freedom of movement to permit dancing. FIG. 1 illustrates a representation of the rear side of any conventional stereo amplifier A to which device 10 and particularly ends 20b of lead wires 20 are to be attached preparatory to use. Amplifier A is shown as having right and left channel output terminals RT1, RT2 and LT1, LT2 which are connected to terminals in the rear of right speaker RS and left speaker LS by wiring RW1, RW2 and LW1, LW2, respectively. The terminals (not shown in detail) of speakers RS and LS usually permit easy attachment and separation of the short length of bare wire provided to terminate wiring RW1, RW2 and LW1, LW2 for this purpose. The lengths of bare wire at ends 20b of lead wires 20 or any connector mounted thereon may be attached directly to the terminals RT1, RT2 of the right channel or to terminals LT1, LT2 of the left channel after disconnecting therefrom wiring RW1, RW2 or LW1, LW2, respectively. Also, as an alternative, wiring RW1, RW2 or LW1, LW2 may be disconnected at the respective speaker terminals and spliced onto ends 20b by twisting the two bare wires together and applying a twisted wire retention cap 25 to each splice in the well known manner. In the illustration in FIG. 1, wiring LW1, LW2 are shown disconnected from left speaker LS and spliced onto lead wires 20 with the aid of retention caps 25 while right speaker RS remains connected to the right channel terminals RT1, RT2 for providing sound therethrough.

Each person of the participating couple then places one of the belts 11 around his/her waist with layer 13 facing inwardly in contact with the bare skin and, bringing end 11b to overlie end 11a, selectively engages hook 15 in the appropriate opening 14 to provide a snug fit for belt 11. Adjustment for proper output of amplifier A is then accomplished by initially setting the volume control to a minimum and the balance control to a maximum for the channel to which the belts 11 are attached, this being the left channel in the hook-up shown in FIG. 1. Music is then played through amplifier A and, with the participants in skin contact with each other, as for example, holding hands as shown in FIG. 1, the volume control is advanced until the desired tingling sensation is felt in the area of skin contact between the participants. The balance control is then rotated toward the right channel until the sound emitted by right speaker RS is at a comfortable volume for listening. This will reduce the sensation and may require a volume increase and another balance adjustment. By slight alternate adjustments of the volume and balance controls the desirable sound and sensation levels can be achieved. In disco and rock music, adjustment of the base and treble controls to accentuate the base imparts a rhythm beat or bounce to the sensation while accentuation of the treble and attenuation of the base imparts more of a tingling sensation.

Device 10 may be utilized by one person rather than by a couple by such person wearing both belts 11, preferably around the torso, in spaced relation so that conductor layers 13 do not make direct contact and thereby short circuit each other. To facilitate this, a modified form of the invention is shown in FIG. 4 as device 30 which comprises a single, body encircling belt 31 considerably wider than belt 11, formed with a supporting sheet or layer 32 for a pair of longitudinally extending electrical conductor layer sections 33 spaced from each other along a midline section 32a, layer 32 and layer sections 33 being similar in material and properties to layers 12 and 13, respectively, of belt 11. Similarly, each layer section 33 has a lead wire 40 connected thereto by a wire connector 43 and rivet 44, while hook 35 and openings 34, located in midline section 32a, provide the buckle means for belt 31. Lead wires 40 are also protected by replaceable fuses (not shown) and the opposite ends thereof are adapted to connect to the pair of terminals of one of the channels of amplifier A in the same manner as wires 20.

Device 50 is a structural modification of device 10 embodying the invention and comprising a pair of belts 51 each having a lead wire 60 for connection to amplifier A. One of such belts 51 is shown in FIGS. 5 and 6 to comprise metal sheet 53 of a thickness to provide both the support characteristics and flexibility of layer 12 and the electrical conductivity of layer 13 of belt 11. Sheet 53 may be made of 0.015 to 0.020 inch thick aluminum or 0.010 to 0.015 inch thick stainless steel. The edges 53a of sheet 53 are all beaded or rolled in a conventional manner to prevent cutting the skin by a sharp unfinished edge when belt 51 is handled or worn. Hook 55 is stapled directly to sheet 53 which is also formed with spaced openings 54 serving as adjustable buckling means. To facilitate manufacture, openings 54 may extend along the entire length of sheet 53. Lead wire 60 is similar to lead wires 20 and 40, having a connector 63 attached to wire end 60a and secured to sheet 53 by a rivet 64, here shown as being of the solid type. To reduce the possibility of undesirable electrical contact with sheet 53 when in use, a layer 52 of vinyl resin, serving as an insulator, may be sprayed onto the outfacing surface of sheet 53, or the latter may be made from sheeting material preformed with a coating of enamel or the like paint which serves the same purpose as well as adding to the aesthetic appeal of belt 51.

To provide greater versatility to devices 10 and 50, a hand held wand 70 may be included for use with one or both belts 11 and 51 in the manner hereinafter described. Wand 70 is seen in FIG. 7 to comprise a length of aluminum tubing 71 sized for easy grasping in one hand and having a lead wire 80 secured thereto for electrically connecting wand 70 to one of the output terminals of stereo amplifier A. The opposite ends of tubing 71 are preferably closed and finished by suitable slip-on, fitted caps 72 and 72a, as shown, made of rubber or plastic, or a plug type closure may also be used. Whereas any suitable means may be used for securing lead wire 80 to tubing 71, the wand connecting end 80a of wire 80 is shown in FIG. 7 as extending through an opening in cap 72a into the bore of tubing 71 and terminating in a wire connector 83 secured to the interior surface of tubing 71 by a suitable rivet 84 which may be of the outside pull or "pop" type. Lead wires 60 and 80 may each also be fitted with a separable fuse holder and replaceable fuse similar to holder 21 and fuse 22 of lead wire 20, the rating of the fuses used in lead wires 20, 40, 60 and 80 being selected in the fraction of an ampere range to afford maximum protection. Likewise, lead wire 80 is of a length comparable to lead wire 20 or 60 and has the opposite end 80b thereof prepared for attachment to the appropriate output terminal of amplifier A.

When device 10 or 50 is provided as a three-unit device by including a wand 70 in addition to the pair of belts 11 or 51, respectively, the pair of lead wires 20 or 60 are connected as hereinbefore described in the operation of device 10 and the opposite end 80b of lead wire 80 is connected to the appropriate output terminal of amplifier A so that the wand 70 is in parallel with one of the belts 11 or 51. When the participants wish to hold hands to feel the sensation, wand 70 is held in the other hand by the participant wearing the belt 11 or 51 which is connected in parallel with wand 70. When the participants desire to separate, wand 70 is passed to the other participant who will feel the sensation, which is similar to that experienced between the grasped hands, in the hand grasping wand 70. Also, wand 70 may be passed to a third participant for grasping in one hand while holding hands and feeling the sensation with the participant wearing the belt 11 or 51 which is not connected in parallel with wand 70.

The scope of the invention also contemplates a device comprising two wands 70 connected to the terminals of amplifier A in the manner described for belts 11 of device 10. Each wand 70 is then grasped in one hand by each of the two participants while they hold each other's other hand.

The three-unit device 10 or 50 may be useful in teaching dancing to the profoundly hearing impaired where the instructor wears the belt 11 or 51 which is wired in parallel with wand 70. The instructor holds the wand 70 while dancing in hand contact with the student, but passes the wand 70 to the student when the dance instruction requires the student to separate from and move independently of the instructor.

Metal sheets 13, 33 and 53 render satisfactory results when each sheet is made in a length sufficient to substantially encircle the torso of the wearer in skin contact therewith and is 3 and 4 inches in width providing an overall skin contacting area of about 90 to 130 sq. inches. Wand 70 when having tubing 71 of ¾ inch O. D. and about 10 inches in length is easy to handle and renders satisfactory results in use.

One output terminal of each of the channels of amplifier A may be a common ground so that, instead of the output configuration shown in FIG. 1, amplifier A has only three output terminals, namely, a right and left channel output and a common ground terminal to which one lead to both right and left speakers RS and LS connect. Thus, it will be understood that a recitation in the claims of two output terminals to which units of devices 10, 30 and 50 connect is to include one terminal of a channel and the common ground of such three terminal arrangement.

The two- and three-unit devices for feeling music herein disclosed are seen to achieve the several objects of the invention and to be well adapted to meet conditions of practical use. As various possible embodiments might be made of this invention, and as various changes might be made in the disclosed units, it is to be understood that all matters herein set forth or shown in the accompanying drawings are to be interpreted as illustrative and not in a limiting sense.

What is claimed is:

1. A device for feeling music being played through a first channel of a stereo amplifier having a pair of output terminals for said channel by applying the output of said first channel through the bodies of one or more participants while the music on the other channel is being played through a speaker, said device comprising a pair of electrically chargeable conductors, each having an exposed surface area for contacting the skin of a participant, a lead wire electrically secured at one end to each of said conductors and having an opposite end adapted to connect to one of said output terminals, at least one of said lead wires having a replaceable interposed fuse to limit the current output between the two amplifier terminals of said first channel.

2. The device defined in claim 1 in which one of said conductors is an elongated sheet of an electrical conductor material formed as a component of a torso encircling belt with said exposed skin contacting surface located along the interior surface of the belt.

3. The device defined in claim 2 in which said belt is a sheet of thin flexible metal forming said electrical conductor, said lead wire securing to said conductor being a wire connector terminating said lead wire first end located on the exterior facing side of said belt and connected by a rivet passing through said metal sheet, and size adjustable buckling means for said belt including a hook fastened to and extending from one end of said sheet and a series of spaced openings formed along a midline of the sheet adjacent the opposite end of the sheet, said openings being sized for selective releasable engagement by said hook.

4. The device defined in claim 3 in which said metal sheet is formed with beaded edges and an electrical insulating coating on the exterior facing surface thereof.

5. The device defined in claim 2 in which said belt is formed as a laminated structure having a supporting layer of plastic sheet material and said conductor is a metal foil layer lining said supporting layer.

6. The device defined in claim 1 in which a supporting sheet of plastic material forms a torso encircling belt and said conductors are a pair of metal foil layers arranged in spaced relation insulated from each other on an interior facing side of said supporting sheet.

7. The device defined in claim 1 in which one of said conductors is a metal tubing formed as a component of a wand sized for grasping by the hand of a participant as said skin contacting surface area.

8. The device defined in claim 7 in which a cap terminates one end of said tubing and said lead wire first end extends through an opening in said cap, said lead wire securing to the conductor being a wire connector terminating said lead wire first end and connected by a rivet passing through the wall of the tubing.

9. The device defined in claim 1 including a third electrically chargeable conductor and a lead wire electrically secured at one end thereof to said third conductor and having an opposite end adapted to connect to one of said output terminals in parallel with one of the conductors and lead wires of said first mentioned pair.

10. The device defined in claim 9 in which each of said pair of conductors is an elongated sheet of an electrical conductor material formed as a component of a torso encircling belt with said exposed skin contacting surface located along the interior facing side of the belt, said third conductor being a metal tubing formed as a component of a wand sized for grasping by the hand of a participant as said skin contacting surface area.

11. The device defined in claim 2 in which the skin contacting area of the conductor formed as a component of a torso encircling belt is between 90 to 130 sq. inches.

* * * * *